United States Patent
Andrade et al.

(10) Patent No.: US 12,320,916 B1
(45) Date of Patent: Jun. 3, 2025

(54) STATIC DOME ASSEMBLY FOR LIDAR SYSTEMS

(71) Applicant: Waymo LLC, Mountain View, CA (US)

(72) Inventors: Justin Andrade, San Jose, CA (US); Hui Son, Hayward, CA (US); Blaise Gassend, East Palo Alto, CA (US); Jason Watson, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 443 days.

(21) Appl. No.: 17/379,752

(22) Filed: Jul. 19, 2021

(51) Int. Cl.
| | | |
|---|---|---|
| G01S 7/02 | (2006.01) |
| G01S 7/481 | (2006.01) |
| G01S 17/00 | (2020.01) |
| G01S 17/88 | (2006.01) |
| G01S 17/931 | (2020.01) |
| G01S 7/497 | (2006.01) |

(52) U.S. Cl.
CPC ............ *G01S 7/027* (2021.05); *G01S 7/4813* (2013.01); *G01S 17/003* (2013.01); *G01S 17/88* (2013.01); *G01S 17/931* (2020.01); *G01S 2007/4977* (2013.01)

(58) Field of Classification Search
CPC ...... G01S 7/027; G01S 7/4813; G01S 17/003; G01S 17/88; G01S 17/931; G01S 2007/4977
See application file for complete search history.

(56) References Cited

U.S. PATENT DOCUMENTS

| | | | |
|---|---|---|---|
| 8,167,450 B2 | 5/2012 | Hudson | |
| 10,533,876 B2 | 1/2020 | Ghannam | |
| 10,845,470 B2 | 11/2020 | Verghese et al. | |
| 11,003,055 B2 | 5/2021 | Idera et al. | |
| 2009/0115891 A1* | 5/2009 | Ryu | H04N 23/57 348/374 |

(Continued)

FOREIGN PATENT DOCUMENTS

| | | |
|---|---|---|
| WO | 2020/109007 | 6/2020 |
| WO | 2020/215577 | 10/2020 |
| WO | 2020/247245 | 12/2020 |

OTHER PUBLICATIONS

Pallabi Paul, et al., "Antireflection Coating on PMMA Substrates by Atomic Layer Deposition," www.mdpi.com/journal/coatings, Coatings 2020, 10, 64.

(Continued)

*Primary Examiner* — Jonathan M Hansen
(74) *Attorney, Agent, or Firm* — McDonnell Boehnen Hulbert & Berghoff LLP

(57) ABSTRACT

Example embodiments described herein involve a static dome assembly for light detection and ranging (LiDAR) systems. The system may include a base. At least one LiDAR system may be coupled to the base. The at least one LiDAR system may be configured to transmit and receive light having one or more wavelengths. The assembly may further include a housing encompassing the at least one LiDAR system. The housing may be statically coupled to the base. The housing may further include a dome. The dome may include a wall that is transparent to the one or more wavelengths. The wall may also include a high impact polymethyl methacrylate (PMMA) material having an index of refraction of less than 1.55.

19 Claims, 10 Drawing Sheets

(56) References Cited

U.S. PATENT DOCUMENTS

| | | | |
|---|---|---|---|
| 2016/0264064 A1* | 9/2016 | Byrne | B60S 1/52 |
| 2016/0291134 A1* | 10/2016 | Droz | G01S 7/4817 |
| 2016/0349788 A1* | 12/2016 | Lee | G06F 1/1637 |
| 2017/0067621 A1* | 3/2017 | Anselm | F21V 11/14 |
| 2018/0348426 A1* | 12/2018 | Wasserman | F21S 4/28 |
| 2019/0361090 A1 | 11/2019 | Ochiai | |
| 2019/0377060 A1 | 12/2019 | Ochiai | |
| 2020/0003604 A1* | 1/2020 | Le Gall | G01D 5/3537 |
| 2020/0141716 A1* | 5/2020 | Droz | G01S 17/89 |
| 2020/0159006 A1 | 5/2020 | Quenzer et al. | |
| 2020/0275759 A1* | 9/2020 | Chevalier | A45D 40/0068 |
| 2020/0377692 A1 | 12/2020 | Grosser et al. | |
| 2021/0061185 A1* | 3/2021 | Wheeler | H04R 1/04 |
| 2021/0197733 A1* | 7/2021 | Percival | G03B 17/02 |
| 2021/0293933 A1* | 9/2021 | Schmidt | B61D 49/00 |
| 2022/0229158 A1* | 7/2022 | Ye | G01S 7/4813 |

OTHER PUBLICATIONS

Custom Optical Domes/Acrylic/BK7/UVFS/Knight Optical, Global Leaders in Custom Optical Solutions, https://www.knightoptical.com/custom/optical-components/uv-vis-nir-optics/windows/domes, print from the World Wide Web May 17, 2021.

PMMA Domes Lens/VY Optoelectronics Co., Ltd., PMMA acrylic domes lens with flange, https://www.vyoptics.com/pmma-acrylic-dome-lens-with-flange.html, printed from the World Wide Web May 17, 2021.

* cited by examiner

| | Mechanical Properties | | | | | Optical Properties | | | | |
|---|---|---|---|---|---|---|---|---|---|---|
| Material | Coefficient of Thermal Expansion (x10^-6/degC) | Opperating Temperature (degC) | % H2O Absorption (24h Immersion) | Notched IZOD Impact Resistance (kJ/m2) | Surface (Scratch) Hardness [Pencil Test] | Specific Gravity | Index (D-Line 89.2nm) | Abbe Number | dn/dt (10^-6/degC) | Uncoated Transmittance in the Visible Spectrum (%) | Birefringence (Scale 0 to 10) |
| PMMA | 60 | 85 | 0.3 | 5 | 3H | 1.18 | 1.49 | 58 | -105 | 92 | 4 |
| COP | 60 | 135 | <0.01 | | | 1.02 | 1.53 | 56 | -101 | 92 | 2 |
| COC | 60 | 150 | <0.01 | | | 1.02 | 1.53 | 58 | -101 | 92 | 2 |
| Polycarbonate | 68 | 120 | 0.2 | 70 | 4B-5B | 1.25 | 1.585 | 34 | -107 | 89 | 7 |
| Styrene | 50 | 75 | 0.1 | 20 | | 1.05 | 1.59 | 31 | -140 | 88 | 10 |
| Polyester | 72 | 125 | 0.15 | | | 1.22 | 1.61 | 27 | -130 | 90 | 2 |
| PEI | 58 | 170 | 0.25 | 50 | | 1.27 | 1.68 | 19 | - | 50 | - |
| Glas N-BK7 (reference) | 7.1 | >400 | - | Very Low | 9H | 2.51 | 1.52 | 64 | 3 | 91 | 1 |
| OPTIMAL Material within reason | <60 | >100 | <0.15 | >50 | >HB | <2 | <1.55 | >40 | <50? | >90 | <5 |

Figure 5

STATIC DOME ASSEMBLY FOR LIDAR SYSTEMS

BACKGROUND

Unless otherwise indicated herein, the materials described in this section are not prior art to the claims in this application and are not admitted to be prior art by inclusion in this section.

A Light Detection and Ranging (LiDAR) device is used for sensing aspects of an environment. LiDAR systems may typically be enclosed within a housing to protect the LiDAR system from damage. The housings may be made from a variety of materials, but are typically made from polycarbonate or glass. Polycarbonate is more affordable than glass and can be injection molded. However, polycarbonate has low optical qualities and also has low scratch resistance. LiDAR housings may also be static relative to the LiDAR system or may spin with the LiDAR system. When made from polycarbonate, the optical qualities of static domes may interfere with the optics of a spinning LiDAR. Alternatively, spinning domes can attract unwanted attention.

SUMMARY

The present disclosure generally relates to a static dome assembly for LiDAR systems. Particularly, the dome may be made of a high impact polymethyl methacrylate material having an index of refraction of less than 1.55.

In one aspect, the present application describes a system. The system may include a base and at least one LiDAR system coupled to the base. The at least one LiDAR system may be configured to transmit and receive light having one or more wavelengths. The system may further include a housing encompassing the at least one LiDAR system. The housing may be statically coupled to the base. The housing may further include a dome. The dome may include a wall that is transparent to the one or more wavelengths. The wall may also include a high impact polymethyl methacrylate (PMMA) material having an index of refraction of less than 1.55.

In another aspect, the present application describes a system for a LiDAR dome. The system may include a circular rim. The system may further include a wall extending from the circular rim. The wall may be transparent to one or more wavelengths. The wall may further convene to form a crown such that the wall is in the shape of a dome with a height greater than the diameter of its base. The wall may also define a cavity. The system may further include a PMMA material having an index of refraction of less than 1.55.

In another aspect, the present application describes a method for measuring optical qualities in a dome. The method may include selecting at least one point position along an outer surface of the dome, measuring at least one point position along an inner surface of the dome that is normal to the at least one point position along the outer surface of the dome, measuring a thickness of the dome based on the distance between the at least one point position along the outer surface and the at least one point position along the inner surface, defining a spherical region of interest (ROI) centered at the at least one point position along the outer surface and the at least one point position along the inner surface, calculating a standard deviation of the thickness of the dome within the ROI, and determining the standard deviation is less than a predetermined value.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

Example embodiments should become apparent from the following description, which is given by way of example only, of at least one preferred but non-limiting embodiment, described in connection with the accompanying figures.

FIG. 5 illustrates a chart of mechanical and optical properties by material, according to an example embodiment.

DETAILED DESCRIPTION

Figure 1:
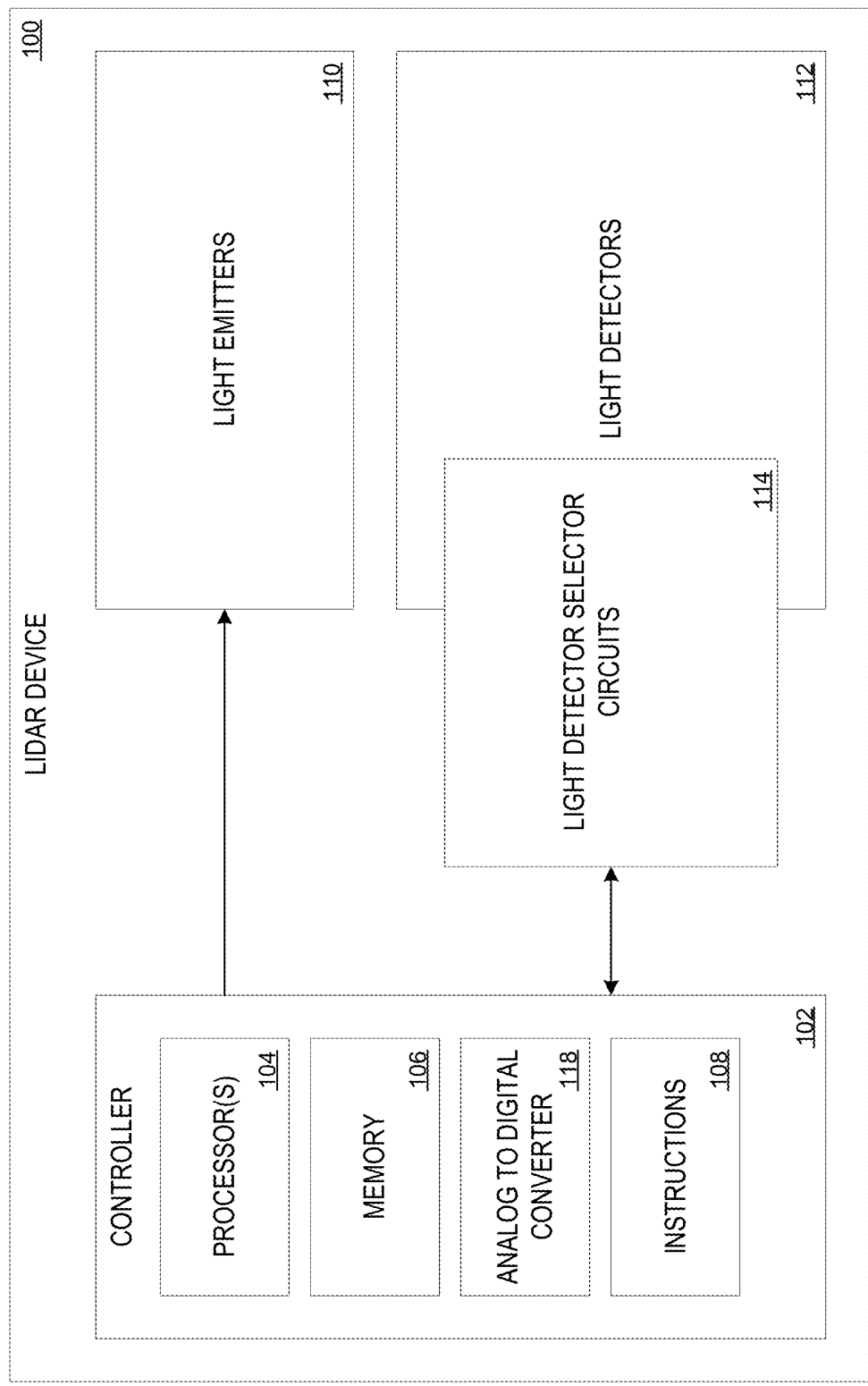
FIG. 1 is a block diagram of a LiDAR system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Light Detection and Ranging (LiDAR) devices are used for sensing aspects of an environment. Light emitters in a LiDAR system can emit light pulses which may reflect off of objects in the environment of the LiDAR. The reflected light pulses may be received by the LiDAR's light detectors. Further, the LiDAR may rotate to increase the amount of the environment that the LiDAR scans. With the reflected pulses detected by the light detectors, a computing system may determine a 3D point cloud of the environment and may further determine where objects are located in the environment.

An example LiDAR system may include a single light emitter and a single light detector, or alternatively may include additional light emitters and/or light detectors. The single light emitter may emit light (alternatively referred to as a "primary signal") that is reflected toward a surrounding environment by a rotating, multi-faceted mirror (e.g., a rotating triangular mirror having three facets). The light may be transmitted through an optical window (e.g., a slab of glass or plastic that is approximately 1 mm in thickness) before being transmitted to the environment. As an example, the environment could include an interior or exterior environment, such as inside a building or outside of the building. Additionally or alternatively, the environment could include a vicinity around and/or on a roadway. Furthermore, the environment could include objects such as other vehicles, traffic signs, pedestrians, roadway surfaces, buildings, terrain, etc. Additionally light pulses could be emitted into a local environment of the lidar system itself. For example, the light pulses could interact with a housing of the lidar system and/or surfaces or structures coupled to the lidar system.

Upon reflection of a portion of the light transmitted from the LiDAR system by an object in the environment, reflected light (i.e., a "reflected primary signal") may be transmitted back through the optical window and may be directed to the single light detector for light detection. Directing the reflected light back to the single light detector may include reflecting the light toward the single light detector off of the rotating, multi-faceted mirror, for example. Based on the timing of the detected light and/or the position of the rotating, multi-faceted mirror, a distance to and/or location of the target may be determined.

Typically, LiDAR systems are covered by a protective housing, which may also be referred to as a dome, as the housing may have dome characteristics. The housing may protect the LiDAR from dirt, debris and other damage. Because the housing covers the LiDAR system, light pulses must travel through the housing. Thus, a housing should allow the light pulses to transmit through the housing without being aberrated or obscured.

Currently, LiDAR housings are typically made from at least one of glass or polycarbonate. As a housing, glass has the optical qualities of having a low index of refraction (approximately 1.52), a low birefringence (approximately 1), a high Abbe number (approximately 64), and a high scratch resistance. However, glass has a low impact resistance making it dangerous in high traffic areas and has a high cost of manufacturing, making mass manufacturing of LiDAR housings less affordable. On the other hand, polycarbonate has a high impact resistance, a high operating temperature, and is low cost to mass manufacture. Nevertheless, polycarbonate has a high index of refraction (approximately 1.585), a high birefringence (approximately 7), a low abbe number (approximately 34), and a low scratch resistance. Additionally, when formed into a dome around a LiDAR, the curvature of a polycarbonate housing may create other negative optical effects. Moreover, typical injection molding of polycarbonate housings often result in imperfections which also interfere with LiDAR operations. For example, there may be severe distortion of light pulses causing a loss of wavefront quality as the pulses go through the housing. In long range LiDARs the distortion could have an even greater effect on the light pulses.

Because of these qualities, the current approach for using polycarbonate in LiDAR housings is to mold a flat window in the housing for the LiDAR to emit and detect light pulses through. Because of this, the polycarbonate housing typically spins with the LiDAR. However, spinning LiDAR housings are hard to clean and may attract unwanted attention.

Example embodiments presented herein may involve a system for a static dome assembly for LiDAR systems. In an example embodiment, the static dome assembly may include a base and at least one LiDAR system coupled to the base. The at least one LiDAR system may be configured to transmit and receive light having one or more wavelengths. Additionally, the at least one LiDAR system may be rotatably coupled to the base such that the base remains stationary while the LiDAR system rotates. The base may also be coupled to a device which utilizes LiDAR systems, such as an autonomous vehicle or an autonomous robot. The system may further include a housing encompassing at least one LiDAR system. The housing may be statically coupled to the base such that it remains stationary with the base while the LiDAR system rotates. The housing may be a dome which has a height greater than the diameter of its base. Alternatively, the dome may have a height that is equal to or less than the diameter of its base. The dome may further include a wall that is transparent to the one or more wavelengths the LiDAR is configured to transmit and receive. Finally, the wall of the housing may be made from a high impact polymethyl methacrylate (PMMA) material having an index of refraction of less than 1.55. The PMMA material may be injection molded into the dome shape in line with specific thickness tolerances. Molding the dome out of a high impact PMMA material may assist in making the dome more scratch resistant and more impact resistant. In addition, the high impact PMMA may have desirable optical qualities while in a dome shape.

Additional example embodiments included herein may also include a LiDAR dome. The LiDAR dome may include a circular rim. The rim may be a flat surface having a predetermined thickness. A wall that also has the predetermined thickness may extend from the circular rim and convene to form a crown. The shape of the wall extending from the circular rim to the crown may have a height greater than the diameter of the circular rim. Alternatively, the shape of the wall extending from the circular rim to the crown may have a height that is equal to or less than the diameter of the circular rim. The wall may further define a cavity. In other words, the LiDAR dome may be a cavity extending from the inside of the circular rim, to the crown of the wall. The LiDAR dome may further be made from a high impact PMMA material having an index of refraction of less than 1.55. The wall made of the high impact PMMA material may further be transparent to one or more wavelengths. The PMMA material may be injection molded into the dome shape in line with specific thickness tolerances. Molding the dome out of a high impact PMMA material may assist in making the dome more scratch resistant and more impact resistant. In addition, the high impact PMMA may have desirable optical qualities while in a dome shape.

In some cases, after light is emitted from the single light emitter and prior to the emitted light being transmitted through the optical window, a portion of the emitted light may be reflected off an interior side of the optical window. The optical window may be the dome. This reflection may occur if the optical window material has a non-zero reflectance or if one or more substances (e.g., dust or water) are present on the interior side of the optical window, for example. The internally reflected light (alternatively referred to as a "ghost signal") may be inadvertently directed to a different region of the environment than the region of the environment to which the primary signal is directed. For example, if a portion of an emitted light is reflected off of the interior side of the optical window, the reflected portion may be detected by the LiDAR system's detector. Therefore, the LiDAR system may erroneously determine there is an object in the environment based on the reflected "ghost signal." The environment of the erroneously determined object may even be different than the environment associated with the primary signal due to a difference in the angles at which the signals are detected. Upon being reflected from a different region of the environment, the reflected ghost signal may then be directed back to the single light detector (e.g., after reflecting off of the multi-faceted mirror) and detected. Because the different region of the environment may be at a different distance from the LiDAR system than the region of the environment to which the primary signal is directed, the detected ghost signal might lead to errors in determined target distances. For example, a three-dimensional point cloud intended to be representative of an environment could be inaccurate based on the detection of ghost signals.

Errors might arise because a ghost beam (which corresponds to a ghost signal) may be internally reflected off of additional components within the LiDAR system. For example, in some embodiments of the LiDAR system, there may be a second optical window on an opposing side of the rotating, multi-faceted mirror (e.g., for transmitting emitted light toward the environment when such light is reflected from a back-facing facet of the rotating, multi-faceted mirror rather than a front-facing facet). Further, as the ghost beam travels from the interior side of an optical window toward an exterior side of the optical window, the ghost beam may be reflected from either or both surfaces of the optical window (e.g., the reflection can occur at the air-to-glass interface as the ghost beam enters the optical window or the glass-to-air interface as the ghost beam leaves the optical window). These additional internal reflections can lead to an improperly determined distance relative to the LiDAR system (and, correspondingly, an improperly determined vertical position within the environment) of objects within the environment as such additional reflections increase the round-trip travel time of the ghost beam, thereby increasing the time between emission by the light emitter and detection by the light detector (the round-trip travel time being used to determine distance to an object). In still other cases, ghost beams may be internally reflected multiple times off of the rotating mirror and/or the interior side of the optical window before being transmitted to the environment and ultimately reflected from the environment back toward the LiDAR system. Such reflections may cause incorrect distances to objects or incorrect positions of objects to be determined and/or may result in false positives (e.g., the detection of an object when an object is actually not present in the surrounding environment).

Embodiments disclosed herein may also be used to address the issues arising from detecting ghost signals. In various embodiments, ghost signals may be reduced in intensity, eliminated entirely, or blocked (in whole or in part) from being detected by the single light detector. In one approach, baffles (e.g., center baffles) are positioned on the edge(s) of the LiDAR system. The center baffles may include two or more front-back baffles perpendicularly coupled to the center baffle to further protect from ghost signals at different angles. Such baffles may be absorptive (e.g., may be black in color and/or specifically designed to absorb the wavelength of light emitted by the light emitter) and thereby able to reduce ghost beams from propagating to the light detector. The baffles may be fabricated from blackened steel or aluminum, for example. Further, the baffles may extend between 0.5 mm and 3.0 mm (e.g., 1.0 mm) away from the edges of the LiDAR, in various embodiments. In other embodiments, the baffles may be regions of a dome shaped component attached to a non-faceted side of the rotating, multi-faceted mirror, where the dome has a height greater than its diameter.

In addition to optical functions, the baffles may enhance the mechanical properties of the rotating, multi-faceted mirror and/or the LiDAR system. For example, the baffles may reduce the vibration of the multi-faceted mirror when the multi-faceted mirror is rotating about a drive shaft connected to a motor (e.g., thereby reducing the sound produced when the multi-faceted mirror is being driven by the motor). Additionally or alternatively, the baffles may enhance the aerodynamic properties of the multi-faceted mirror (e.g., by blocking a transverse path for air to flow across the multi-faceted mirror and/or by streamlining air flowing in the rotational direction of the multi-faceted mirror). Such enhanced aerodynamic properties may reduce the drag force produced on the multi-faceted mirror, thereby reducing the amount of power needed by the motor to drive the multi-faceted mirror. To further increase the aerodynamic properties of the LiDAR system, in some embodiments, a chamber in which the multi-faceted mirror rotates may be evacuated, thereby producing a vacuum and eliminating all drag forces. Other methods of reducing or eliminating ghost signal detection are also possible.

Referring now to the figures, an example embodiment included herein may include a LiDAR system with a static dome assembly. The system may include a LiDAR system. FIG. 1 is a block diagram of a LiDAR system, according to an example embodiment. In particular, FIG. 1 shows a LiDAR system 100 having a controller 102, a plurality of light emitters 110 and a corresponding plurality of light detectors 112.

Controller 102 includes at least one processor(s) 104, at least one analog to digital converter 118, and a memory 106. The memory 106 may include a computer readable medium, such as a non-transitory computer readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc. Other types of storage devices, memories, and media are also contemplated herein.

The non-transitory computer-readable medium may also store a set of program instructions 108 executable by the processor(s) 104 to perform operations. The at least one processor(s) 104 can include one or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are also contemplated herein.

FIG. 1 also shows a plurality of light detector selector circuits 114. The program instructions 108 are stored on memory 106 and executable by the processor(s) 104 to perform functions related to controlling the light detector selector circuits 114 and functions corresponding to filtering point cloud data. The program instructions 108 are further executable to perform functions related to selecting and powering the plurality of light emitters 110.

The light detectors 112 can receive reflections from light pulses of the light emitters 110. The pulses may be filtered, and based on the instructions 108, the controller 102 can use values (e.g., voltage and/or current) sampled from the light detectors to generate 3D point cloud data, and can process the 3D point cloud data (or perhaps facilitate processing the 3D point cloud data by another computing device, such as the system controller of a system associated with the LiDAR system 100, such as a vehicle controller of a vehicle). Though FIG. 1 depicts a plurality of light emitters and corresponding light detectors it should be understood that a LiDAR system may include a single light emitter. For example, a single light emitter can be used in conjunction with one or more movable mirrors to produce a plurality of beams of light. The functionality described herein may be carried out in single-emitter configurations and in multiple-emitter configurations.

The controller 102 can determine 3D point cloud data by using the light emitters 110 to emit pulses of light. A time of emission is established for each light emitter and a relative location at the time of emission is also tracked. Aspects of an environment of the LiDAR system 100, such as various objects, reflect the pulses of light. For example, when the LiDAR system 100 is in an environment that includes a road, such objects may include vehicles, signs, pedestrians, road surfaces, construction cones, or the like. Some objects may be more reflective than others, such that an intensity of reflected light may indicate a type of object that reflects the light pulses. Further, surfaces of objects may be at different positions relative to the LiDAR system 100, and thus take more or less time to reflect portions of light pulses back to the LiDAR system 100. Accordingly, the controller 102 may track a detection time at which a reflected light pulse is detected by a light detector and a relative position of the light detector at the detection time. By measuring time differences between emission times and detection times, the controller 102 can determine how far the light pulses travel prior to being received, and thus a relative distance of a corresponding object. By tracking relative positions at the emission times and detection times the controller 102 can determine an orientation of the light pulse and reflected light pulse relative to the LiDAR system 100, and thus a relative orientation of the object. By tracking intensities of received light pulses, the controller 102 can determine how reflective the object is. The 3D point cloud data determined based on this information may thus indicate relative positions of detected reflected light pulses (e.g., within a coordinate system, such as a Cartesian coordinate system) and intensities of each reflected light pulse.

Figure 2:
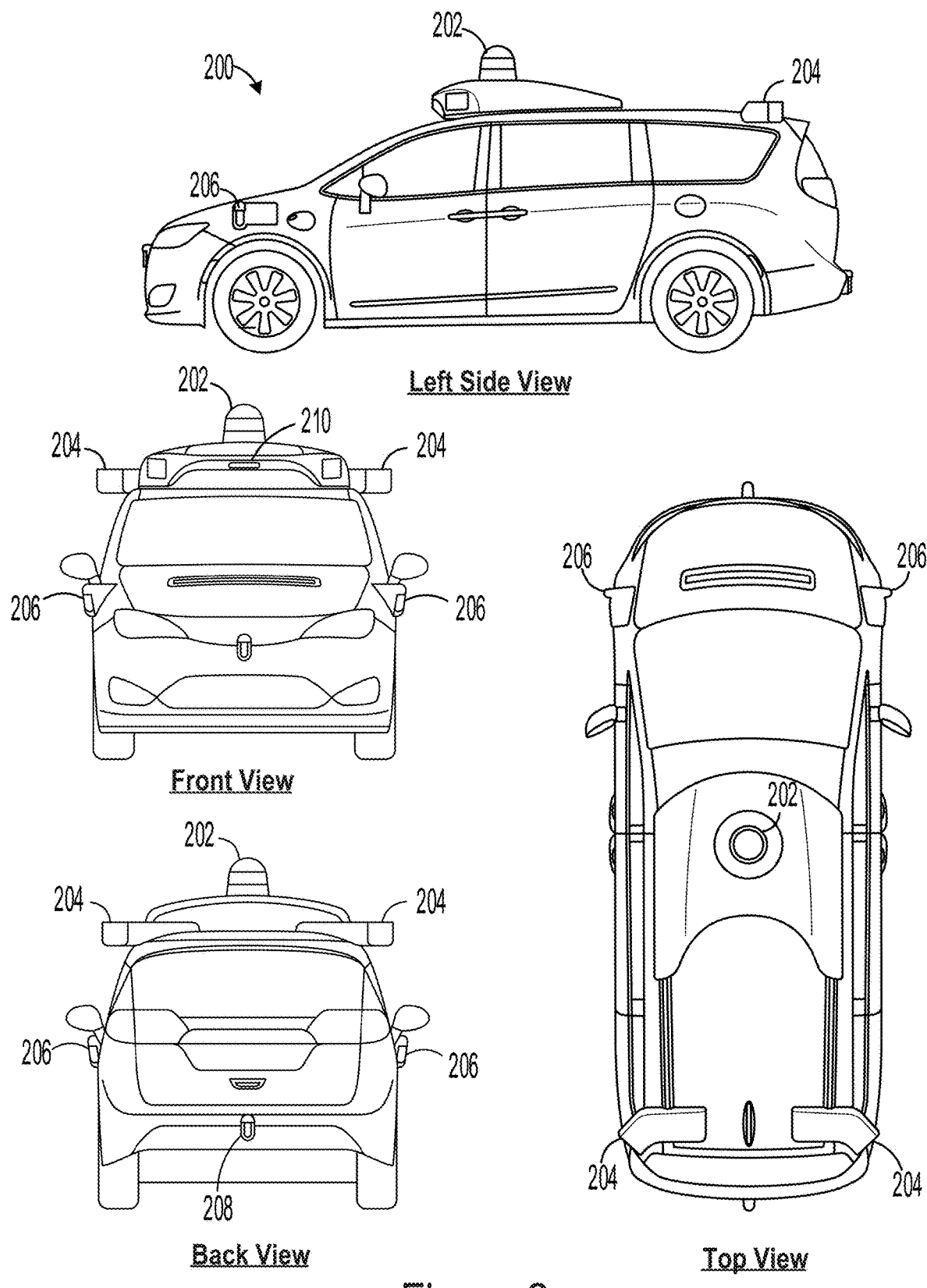
FIG. 2 illustrates a vehicle, according to an example embodiment.

FIG. 2 illustrates a vehicle 200, according to an example embodiment. The static dome assembly could be used together with vehicle 200. While FIG. 2 illustrates an automobile (e.g., a car), it will be understood that other types of vehicles are possible and contemplated herein. For example, the vehicle could be an autonomous robot. The vehicle 200 may include one or more sensor systems 202, 204, 206, 208, and/or 210. The one or more sensor systems 202, 204, 206, 208, and 210 could include one or more of: LiDAR sensors, cameras, radar, and/or acoustic sensors. In some examples, sensor systems 202 and 206 could be similar or identical to LiDAR system 100, however other variations, combinations, and arrangements of sensors are possible.

In an example embodiment, one or more of the sensor systems 202, 204, 206, 208, and 210 could include LiDAR system 100 which may be configured to rotate about an axis so as to illuminate an environment around the vehicle 200 with light pulses. In an example embodiment, sensor systems 202, 204, 206, 208, and 210 may be configured to provide respective point cloud information that may relate to physical objects within the environment of the vehicle 200. The environment, such as the vicinity around a roadway, could include objects such as other vehicles, traffic signs, pedestrians, roadway surfaces, buildings, terrain, etc as previously described. In such scenarios, based on detecting various aspects of reflected light pulses (e.g., the elapsed time of flight, polarization, etc.), information about the environment may be determined. Additionally or alternatively, LiDAR system 100 could include a LiDAR system configured to controllably scan a relatively narrow desired field of view so as to determine point cloud information in a desired portion of the environment around the vehicle. Such a LiDAR system may be configured to provide more accurate point cloud resolution at longer distances.

Example embodiments presented herein may involve a system for a static dome assembly for a LiDAR. The assembly may include an optical quality dome attached to an assembly which houses a LiDAR system. The optical quality dome may be made using a high impact PMMA material which may have enhanced optical characteristics over polycarbonate materials and may also be scratch resistant. The dome and assembly may be configured to include threading which allows for the optical quality dome to be screwed into place, thereby simplifying serviceability. A locking mechanism can also be used to keep the screwed dome in place. The dome and assembly may also be coated in a way that allows internal heating and electromagnetic shielding. In addition, the dome may be coated with various materials to assist in mechanical and optical performance. By moving to high impact PMMA materials for a dome assembly, conventional injection molding can be utilized to produce the dome. Such manufacturers may be cheaper than optical manufacturers.

Figure 3:
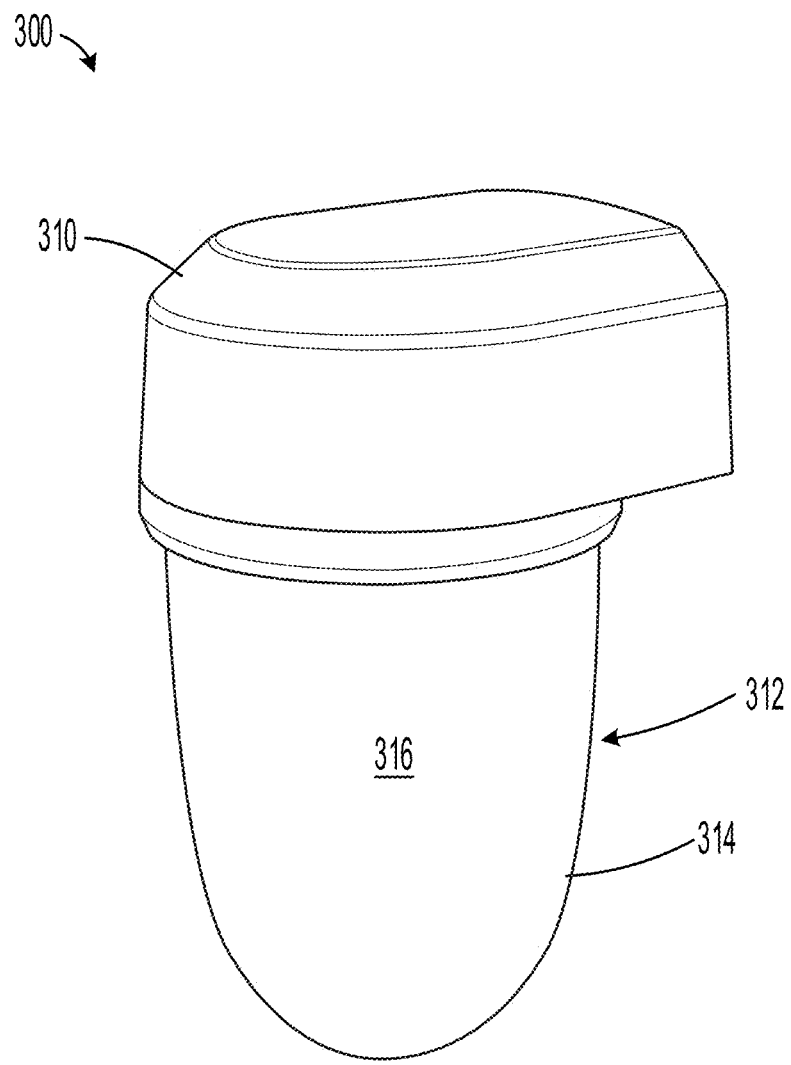
FIG. 3 illustrates a static dome assembly, according to an example embodiment.

FIG. 3 illustrates a static dome assembly 300, according to an example embodiment. As discussed above, the static dome assembly 300 may include a base 310. At least one light detection and ranging (LiDAR) device may be coupled to the base 310. The at least one LiDAR system may be configured to transmit and receive light having one or more wavelengths. The system may further include a housing 312 encompassing the at least one LiDAR system. The housing 312 may be statically coupled to the base 310. The housing 312 may further include a dome 314. The dome 314 may include a wall 316 that is transparent to the one or more wavelengths. The wall 316 may also be made of a high impact polymethyl methacrylate (PMMA) material having an index of refraction of less than 1.55.

Figure 4A:
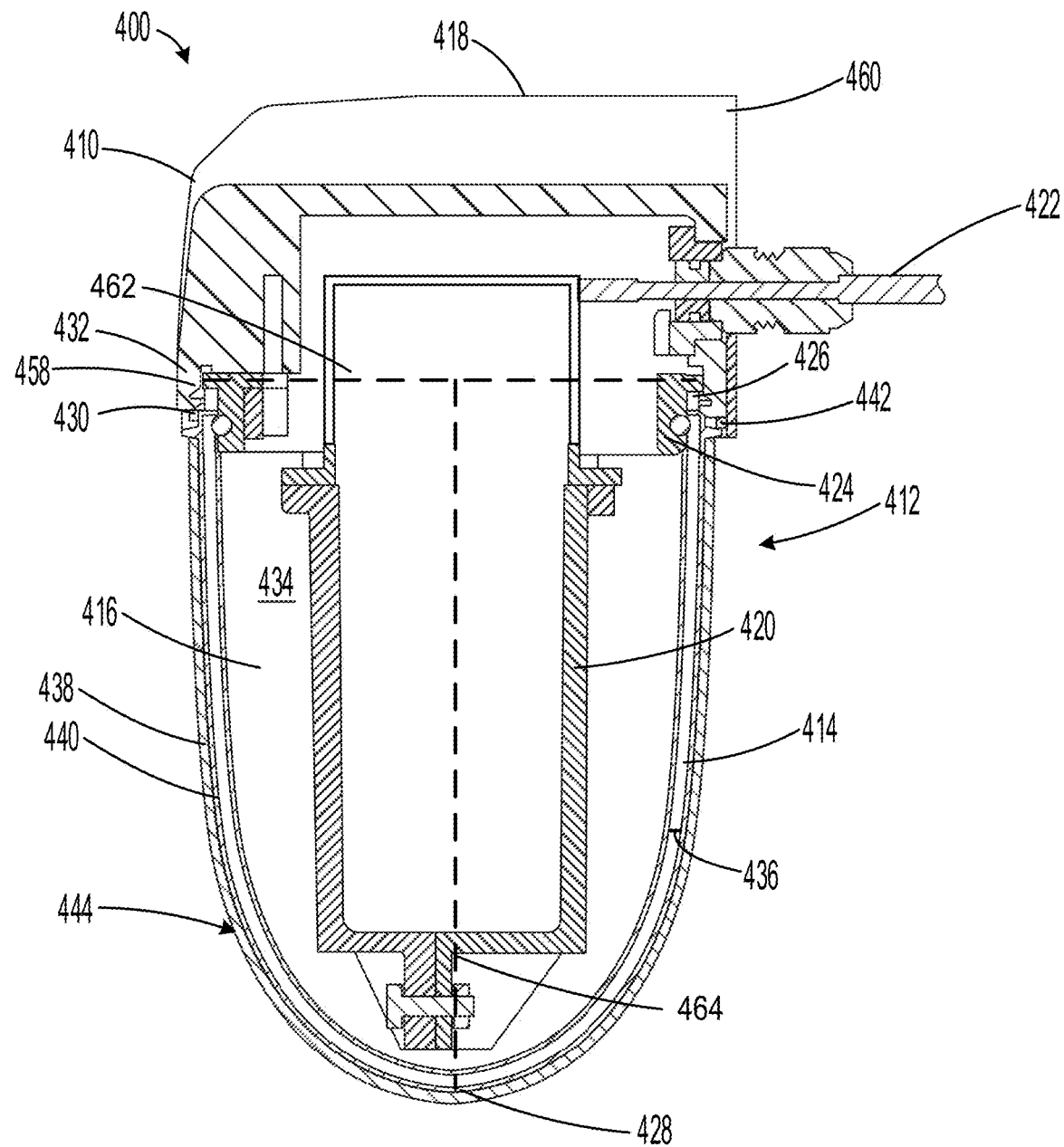
FIG. 4A illustrates a cross-sectional view of a static dome assembly, according to an example embodiment.

FIG. 4A illustrates a cross-sectional view of a static dome assembly 400, according to an example embodiment. The static dome assembly 400 may be attached to a surface by way of a base 410. For example, the surface may be a wall or the roof of an autonomous vehicle. In an example embodiment, the base may include a top 418 and a side 460 through which the base 410 may be attached to the surface. The base may be made of a variety of materials including but not limited to polycarbonate, plastic, PMMA, or metal.

In an example embodiment, at least one LiDAR system 420 may be coupled to the base 410. A power cable 422 may extend through the base 410 from a power source. The power cable 422 may provide power to the LiDAR system 420 so that the LiDAR system 420 may rotate, and the power cable 422 may also serve as a way to transmit data. Although the base 410 may remain stationary, the LiDAR system 420 may be rotatably coupled to the base 410. As with LiDAR system 100, the LiDAR system 420 may be further configured to transmit light through light emitters and receive light with light detectors while rotating in order to scan an environment of the LiDAR system 420. The light that the LiDAR system 420 transmits and receives may be one or more wavelengths. For example, the one or more wavelengths may be infrared wavelengths.

The static dome assembly 400 may also include a housing 412. The housing 412 may encompass the at least one LiDAR system 420 and may be statically coupled to the base 410. Specifically, in an example embodiment, the base 410 and the housing 412 may remain stationary while the LiDAR system 420 rotates within.

The housing 412 may further include at least a seal 424 and a dome 414. The seal 424 could be made of plastic, rubber, or any material suitable for keeping condensation and debris out of the dome 414. The dome 414 may have a height greater than a diameter of its base with a high aspect ratio between the height and the diameter to form the shape of the dome. For example, the dome 414 may have a diameter 462 of approximately 80 millimeters at its base and a height 464 of approximately 85 millimeters. In an alternative embodiment, the height could be approximately 100 millimeters. The shape of the dome may be a hybrid between a cylindrical and an ellipsoidal shape. In alternative embodiments, the dome may be spherical, cylindrical, conical, or ellipsoidal.

In an example embodiment, the dome 414 may be modeled as a five control point cubic spline with end point constraints. The spline may be based on an optimized shape that is designed for a large field of view correction. The field of view may be the field in which the LiDAR system emits and detects pulses. One outcome of optimizing the shape is to minimize the variation in beam deflection and defocus over the field of view. Specifically, the dome will naturally act as a lens, producing defocus and deflection. Because beams may pass through different sections of the dome, the beams may also be deflected in different directions. Typically, LiDAR systems are not designed to compensate for variations in deflection and defocus between beams over the field of view. Optimizing the shape of the dome may assist in minimizing the variation. Another possible outcome of optimizing the shape is to combine the features of a cylinder and a hemisphere into a continuous surface. Specifically, the spline control points may be optimized to closely follow a cylinder which morphs into a hemisphere. The geometry and shape constraints may provide for a more scalable process to allow for easier manufacturing, specifically by injection molding.

Furthermore, the dome 414 may include an interior space such as a cavity. In an example embodiment, the LiDAR system 420 may be disposed within the cavity portion of the dome 414. The dome 414 may further include a circular dome rim 426 and a dome crown 428. The circular dome rim 426 may be a lip circling the dome 414 defining the start of the cavity. The cavity may extend through the circular dome rim 426 until it reaches the dome crown 428. Specifically, the circular dome rim 426 may be positioned opposite the dome crown 428. The dome crown 428 may be a tapered point of the dome shape where the height of the dome is greater than the diameter of the dome's base. Although the dome crown 428 may be the point, in an example embodiment, the dome crown 428 could be a smooth point. For example, the crown 428 could be fusiform.

In an example embodiment, circular dome rim 426 of the static dome assembly 400 may be coupled to the base 410 via threads. In other words, the dome 414 may screw into the base 410. In an example embodiment, dome threads 430 may be disposed adjacent to the circular dome rim 426 on the outside of the dome 414. Additionally, the base 410 may include a lip 432. Base threads 458 may be disposed on the inside of the lip 432. The threads may allow for the dome 414 to be removed from the base 410. The LiDAR system 420 could then be serviced, or the dome 414 could be switched. In additional embodiments, the dome could be coupled to the base via an internal thread. For example, the threads could be disposed inside of the dome and the base could screw into the dome. In other embodiments the dome could also be coupled to the base by a bayonet connector. For example, the lip of the base could include one or more radial pins which fit into matching L-shaped slots with springs. In other embodiments the dome could also be coupled to the base by a flange with a screwed on retaining ring, or a snap.

In an example embodiment, the dome 414 may also include a wall 416 which forms the dome 414 and defines the cavity in the dome 414. The wall 416 may have a substantially uniform thickness 436 with an average thickness of 2 millimeters. The substantially uniform thickness may factor into the optical quality of the dome 414.

In an example embodiment, the wall 416 may be transparent to the one or more wavelengths that the LiDAR system 420 emits and detects. The wall 416 of the dome 414 may be made of a high impact polymethyl methacrylate (PMMA) material that is transparent to the one or more wavelengths. The high impact PMMA material may have a tuned chemistry which changes the mechanical and optical properties of the material. FIG. 5 illustrates a chart with the material properties of high impact PMMA in an example embodiment alongside the material properties of glass and polycarbonate. In an example embodiment, the high impact PMMA material may have an index of refraction of less than 1.55. The high impact PMMA material may have less losses from Fresnel reflections and less birefringence effect than polycarbonate and therefore better optical qualities than polycarbonate. The high impact PMMA material may also have a lower index of refraction and higher impact resistance than glass. In an alternative embodiment, the dome may be made from a combination of the materials listed in FIG. 5.

The mechanical properties of abrasion and impact for the high impact PMMA material may be inverse to each other. For example, the more abrasion resistant a material is, the more brittle it may become. Alternatively, the more impact resistant a material is, the softer it may be and thus more prone to being scratched. In an example embodiment, the high impact PMMA material may have a high impact resistance and a Rockwell hardness of at least F. In an example embodiment, the dome may be coated with another material. Referring back to FIG. 4A, in an example embodiment, to increase the abrasion resistance, the dome 414 may be coated with an anti-abrasion coating 438. The anti-abrasion coating 438 may be a hard coating that has similar properties to glass, such as a high surface hardness. For example, the hard coating may have a Rockwell hardness of at least HB. The anti-abrasion coating 438 may cover the area of the dome 414 that is exposed outside of the base 410.

The dome 414 may also be coated with other materials. For example, the dome 414 may be coated with a conductive coating 440. For example, the conductive coating 440 may be a silver nanowire. The conductive coating 440 may cover the entire surface area of the dome 414. In an example embodiment, the conductive coating 440 may cover an inside 434 of the dome 414 and an outside 444 of the dome 414 including covering the dome threads 430. The conductive coating 440 may have a uniform resistance of 20-30 ohms per square. The conductive coating 440 may have electromagnetic shielding properties when grounded through the dome threads 430. In additional embodiments, the dome may be coated with other materials as well. For example, an anti-reflection coating and/or a hydrophobic coating.

Additionally, the conductive coating 440 may have heating properties. In an example embodiment, the base 410 may include a plurality of bus bars 442 electrically connected to the conductive coating 440 on the dome 414. The bus bars 442 may provide a voltage to the conductive coating 440. The bus bars 442 may be disposed in the base threads 458 and may be in contact with the conductive coating 440 on the dome threads 430. Alternatively, the bus bars could be positioned on the base, but not on the threads. For example, the bus bars could be positioned inside of the lip and could make contact with the conductive coating on the dome that is not on the threads such as the conductive coating on the circular rim, or the conductive coating on the wall. In an example embodiment, power may be provided to the bus bars through electrical wires. Power could be provided through an alternative electrical connection as well.

In an example embodiment, the high impact PMMA material may be dyed such that the wall 416 blocks visible light. For example, the high impact PMMA material may be dyed a dark color such as black, gray, blue, or any combination thereof. Although the high impact PMMA material may be dyed to block visible light, the high impact PMMA material and the wall 416 may be transparent to infrared light, such as the wavelengths emitted and received by the LiDAR system 420. For example, the dome may be dyed in such a way that it blocks 100% of visible light but passes the wavelengths that the LiDAR system is concerned with.

In an example embodiment, the dome 414 may be formed by injection molding. For example, the high impact PMMA material may be used for injection molding. By injection molding, the dome can be made quickly, efficiently, and cost effectively.

Figure 4B:
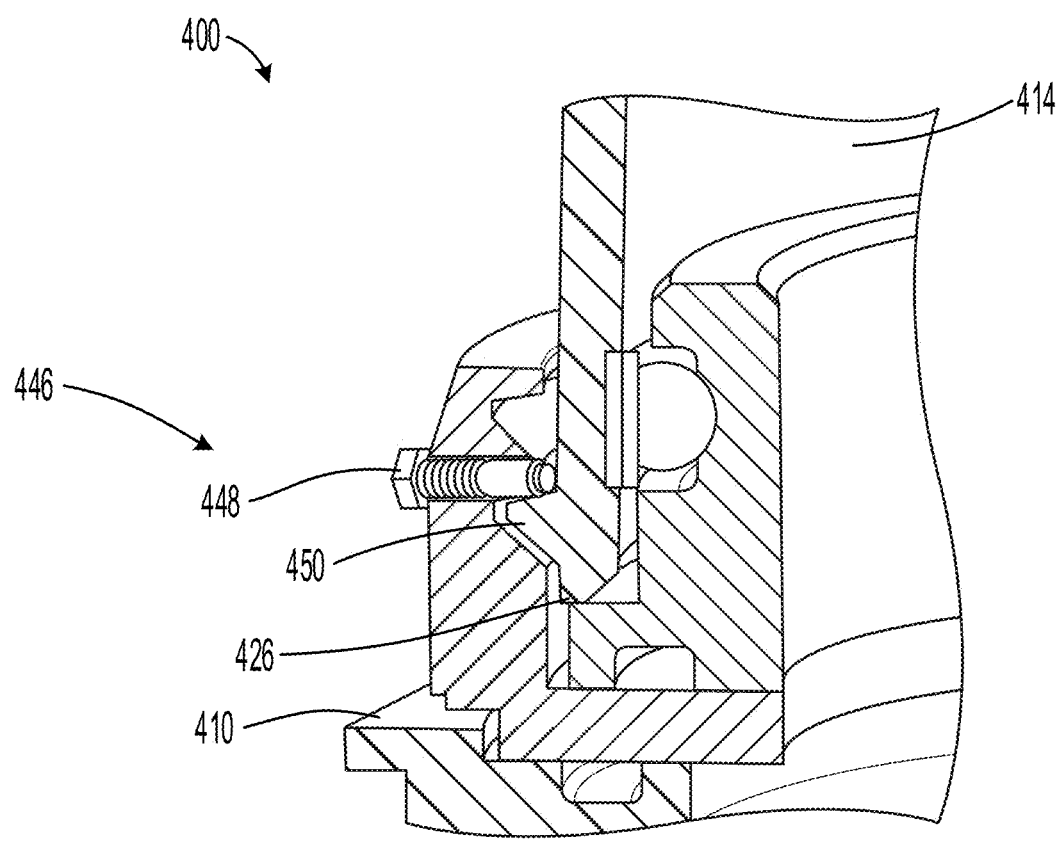
FIG. 4B illustrates a cross-sectional view of a locking mechanism for a static dome assembly, according to an example embodiment.

FIG. 4B illustrates a cross-sectional view of a static dome assembly 400, according to an example embodiment. The static dome assembly 400 may further include a locking mechanism 446. The locking mechanism 446 may include a fastener 448 extending through the base 410. The fastener may be a screw that screws through the base. Alternatively, the fastener could be a spring activated pin. In an example embodiment, the fastener 448 may abut a plurality of screw threads 450 positioned adjacent to the circular dome rim 426. The plurality of screw threads 450 may also be the dome threads 430. The fastener 448 may lock with the screw threads 450 through friction. In an additional embodiment, the plurality of screw threads may include a break. The fastener 448 may fit into the break and prevent the dome 414 from unscrewing from the base 410. The locking mechanism may include any suitable mechanism for locking the dome from unscrewing. For example, the locking mechanism may include a spring loaded pin that fits through a hole in the base and a hole in the dome. Alternatively, the locking mechanism may be a locking tab in the base that clicks into a slot in the plurality of screw threads once the dome is screwed into the base to a predetermined point. In additional embodiments, the dome could be coupled to the base via an internal thread. For example, the threads could be disposed inside of the dome and the base could screw into the dome. In other embodiments the dome could also be coupled to the base by a bayonet connector. For example, the lip of the base could include one or more radial pins which fit into matching L-shaped slots with springs. In other embodiments the dome could also be coupled to the base by a flange with a screwed on retaining ring, or a snap.

Figure 4C:
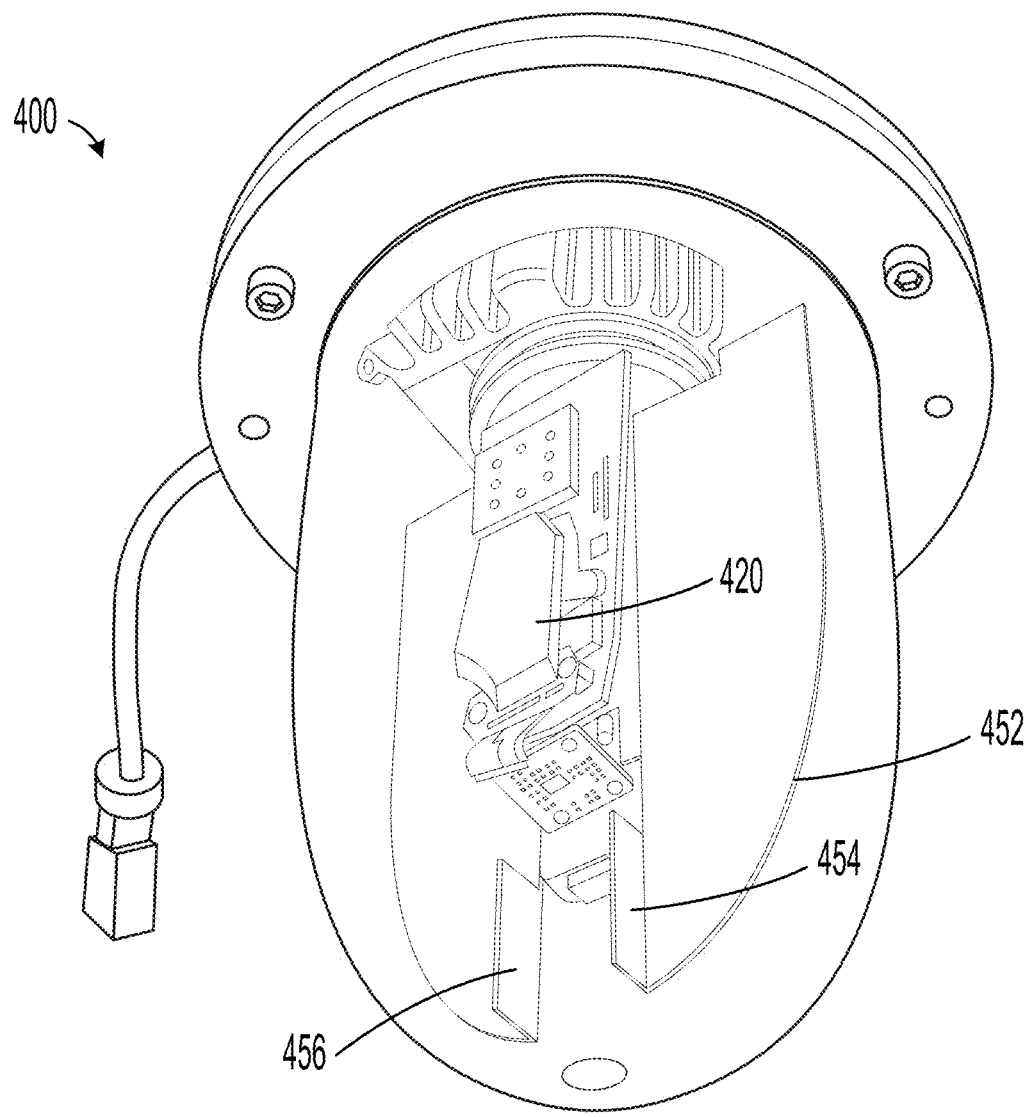
FIG. 4C illustrates a cross-sectional view of a static dome assembly with a center baffle, according to an example embodiment

In some cases, a portion of emitted light may be reflected off an interior side of the wall. This may occur if the wall has a non-zero reflectance or if one or more substances (e.g., dust or water) are present on the interior side of the wall, for example. FIG. 4C is an illustration of the static dome assembly 400 illustrated in FIG. 4A, according to example embodiments. The dome assembly 400 may include LiDAR system 420 and at least one vertically oriented center baffle 452 to absorb light and attenuate internal reflections. As illustrated, the vertically oriented center baffle 452 may be positioned parallel to the y-z plane and adjacent to the LiDAR system 420, such that the center baffle 452 extends from the LiDAR system 420. The center baffle 452 may further include two or more front-back baffles 454 and 456. As illustrated, the front-back baffles 454 and 456 may be perpendicularly coupled to the one or more center baffle 452 on the x-y plane. As illustrated, the front-back baffles 454 and 456 may extend from one side of the center baffle 452. Specifically, the transmit side in order to block outgoing ghost beams. In other words, the front-back baffles 454 and 456 may not be symmetric on the center baffle 452. The front-back baffles 454 and 456 may assist in absorbing any light at glancing angles which may not be absorbed by the center baffle 452.

The center baffle 452 may be absorptive (e.g., the center baffle XX may include a material specifically designed to absorb wavelengths of light). For example, the center baffle 452 may include a surface made of blackened steel. Additionally or alternatively, the center baffle 452 may be made from plastic, aluminum, steel, or BoPET. In some embodiments, additional or alternative absorptive baffles may be included in the LiDAR system 420. As such, greater or fewer than two center baffles 452 may be included (e.g., one, three, four, five, six, seven, eight, nine, ten, etc. absorptive baffles may be included in the LiDAR system 420).

The static dome assembly described herein could be used in a plurality of applications. For example, the static dome assembly could be used in security applications. The dome assembly could be secured to a wall or a ceiling. In an alternative embodiment, the static dome assembly herein could be used as a sensor on a vehicle, such as an autonomous vehicle. In yet another alternative embodiment, the static dome assembly could be used as the sensor on an autonomous robot.

Figure 6A:
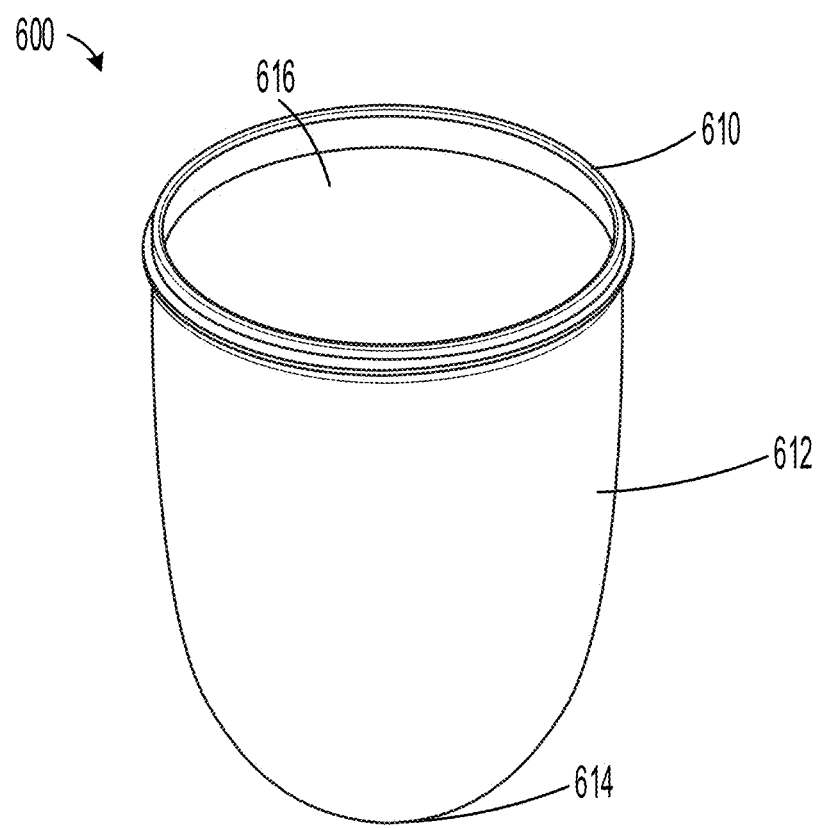
FIG. 6A illustrates a perspective view of a static dome assembly, according to an example embodiment.

An example embodiment described herein may also be a LiDAR dome. FIG. 6A illustrates a LiDAR dome 600, according to an example embodiment. The LiDAR dome may include a circular rim 610. A wall 612 may extend from the circular rim 610. The wall 612 may be transparent to one or more wavelengths. The wall 612 may convene to form a crown 606 such that the dome 600 may have a height greater than the diameter of the circular rim 610. Alternatively, the shape of the wall extending from the circular rim to the crown may have a height that is equal to or less than the diameter of the circular rim. The wall 612 may further define a cavity 616. The LiDAR dome 600 may be made from a high impact polymethyl methacrylate (PMMA) material having an index of refraction of less than 1.55.

Figure 6B:
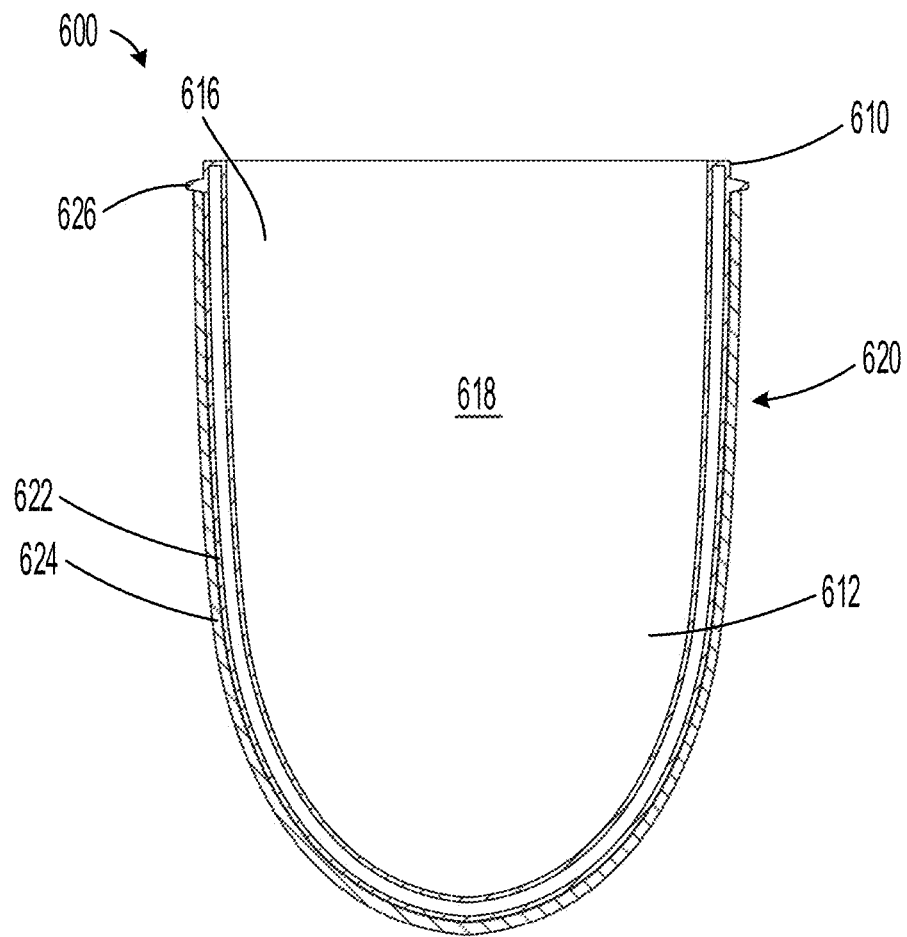
FIG. 6B illustrates a cross-sectional view of a static dome assembly, according to an example embodiment.

FIG. 6B illustrates a cross-sectional view of the LiDAR dome 600 according to an example embodiment. The LiDAR dome 600 may include the circular rim 610. The circular rim 610 may include a lip circling the dome 610 defining the start of the cavity 616. The circular rim 610 may be a flat surface having a predetermined thickness. In an alternative embodiment the circular rim may be a curved surface. The wall 612 extending from the circular rim 610 may also have a predetermined thickness. In an example embodiment, the wall 612 may have an average thickness of 2 millimeters and a root mean square thickness variation of the wall 612 within any 6 mm radius Region of Interest may be less than 4 micrometers. The root mean square thickness variation of the wall 612 may be calculated using the tool previously discussed. Further, in an example embodiment, the wall 612 may be transparent to one or more wavelengths. The wavelengths may be infrared wavelengths. For example, wavelengths emitted and received by a LiDAR system.

In an example embodiment, the LiDAR dome 600 may have a height greater than a diameter of its base. The wall 612 may convene into a crown 606. The wall 612 may further define the cavity 616 within the dome 600. The shape of the dome may be a hybrid between a cylindrical and an ellipsoidal shape. In alternative embodiments, the dome may be spherical, cylindrical, conical, or ellipsoidal. The dome 600 may be modeled as a five control point cubic spline with end point constraints. In an example embodiment, the circular rim 610 may be positioned opposite the crown 606 with the cavity 616 extending through the circular rim 610 up to the crown 606.

In an example embodiment, the LiDAR dome may have an inside 618 and an outside 620 separated by the wall 612. The cavity 616 may fill the inside 618 of the dome 600. The LiDAR dome 600 may further include a plurality of screw threads 626 positioned on the wall 612, on the outside of the LiDAR dome 600. The plurality of screw threads 626 may be positioned on the wall 612 adjacent to the circular rim 610 and opposite the crown 606. In an alternative embodiment, the plurality of screw threads may be positioned on the inside of the LiDAR dome.

In an example embodiment, the wall 612 of the LiDAR dome 600 may be made of a high impact polymethyl methacrylate (PMMA) material that is transparent to the one or more wavelengths. The high impact PMMA material may have a tuned chemistry which changes the mechanical and optical properties of the material. FIG. 5 illustrates a chart of an example embodiment high impact PMMA material's mechanical and optical properties. The high impact material may be optical quality. For example, the high impact PMMA material may have an index of refraction of less than 1.55. The high impact PMMA material may have less losses from Fresnel reflections and less birefringence effect than polycarbonate and therefore better optical qualities than polycarbonate. The high impact PMMA material may also have a lower index of refraction and higher impact resistance than glass. In an alternative embodiment, the dome may be made from a combination of polycarbonate and/or glass.

The mechanical properties of abrasion and impact may be inverse to each other. For example, the more abrasion resistant a material is, the more brittle it may become. Alternatively, the more impact resistant a material is, the softer it may be and thus more prone to being scratched. In an example embodiment, the high impact PMMA material may have a high impact resistance and a Rockwell hardness of at least F. The LiDAR dome 600 may be coated with another material to increase the hardness of the LiDAR dome 600. In an example embodiment, to increase the abrasion resistance, the LiDAR dome 600 may be coated with an anti-abrasion coating 622. The anti-abrasion coating 622 may be a hard coating that has similar properties to glass. The anti-abrasion coating 622 may cover the outside surface of the LiDAR dome 600.

The LiDAR dome 600 may also be coated with other materials. For example, the LiDAR dome 600 may be coated with a conductive coating 624. For example, the conductive coating 624 could be a silver nanowire coating. The conductive coating 624 may cover the entire surface area of the LiDAR dome 600. In an example embodiment, the conductive coating 624 may cover the inside 618 of the LiDAR dome 600 and the outside 620 of the LiDAR dome 600 including covering the screw threads 626. The conductive coating 624 may have a uniform resistance of 20-30 ohms per square. The conductive coating 624 may have electromagnetic shielding properties when grounded. Additionally, the conductive coating 624 may have heating properties. In additional embodiments, the dome may be coated with other materials as well. For example, an anti-reflection coating and/or a hydrophobic coating.

In an example embodiment, the high impact PMMA material may be dyed such that the wall 612 blocks visible light. For example, the high impact PMMA material may be dyed a dark color such as black, gray, blue, or any combination thereof. Although the high impact PMMA material may be dyed to block visible light, the high impact PMMA material and the wall 612 may be transparent to infrared light, such as the wavelengths emitted and received by a LiDAR system. For example, the dome may be dyed in such a way that it blocks 100% of visible light but passes the wavelengths that the LiDAR system is concerned with.

As previously mentioned, the substantially uniform thickness of the dome may be a factor in the dome's optical quality. For example, uniform thickness may improve transmitted wavefront error ("TWE"). TWE contributes to the amount of deviation seen in light transmitted through an optical component. TWE is significantly affected by thickness variation. For example, when light is transmitted through a flat plate, if there is TWE, the TWE can be caused by a variation in plate thickness. TWE is typically measured by directing a beam of light through a material and measuring actual path length as a function of location of the beam, however, this may be difficult for a standard injection molding housing to perform. In an example embodiment, a method may be used that translates TWE into thickness variation to determine an acceptable thickness variation that a standard supplier can understand.

Figure 7:
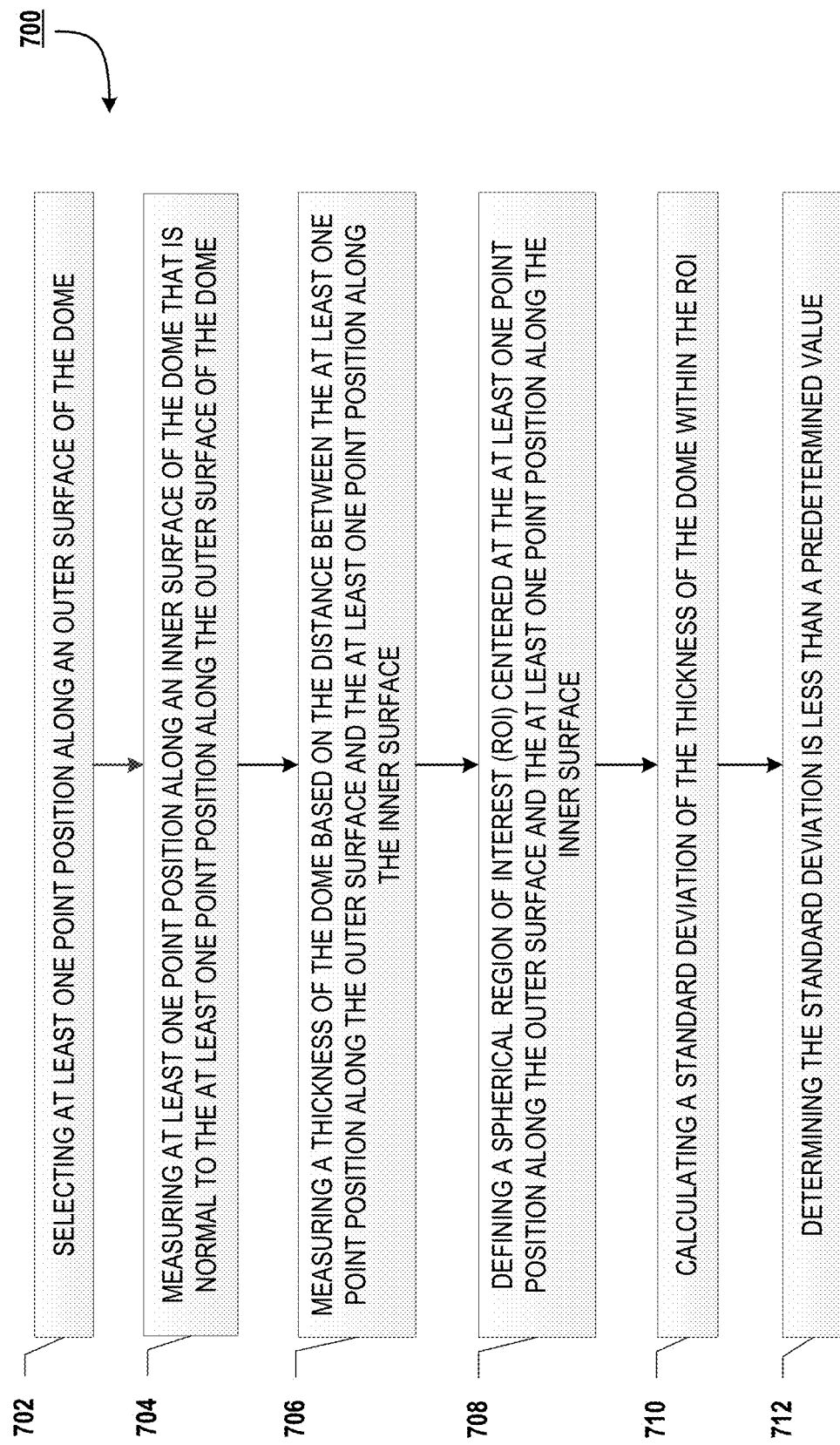
FIG. 7 illustrates a flow chart of a method for measuring optical qualities in a dome, according to an example embodiment . . .

FIG. 7 illustrates an example method 700 for measuring optical quality in a dome. For example, measuring thickness variation that a standard supplier can understand in order to determine if a LiDAR dome is optically valid. This determination of whether the dome is optically valid may also minimize the possibility of TWE. The method may include selecting at least one point position along an outer surface of the dome 702, measuring at least one point position along an inner surface of the dome that is normal to the at least one point position along the outer surface of the dome 704, measuring a thickness of the dome based on the distance between the at least one point position along the outer surface and the at least one point position along the inner surface 706, defining a spherical region of interest (ROI) centered at the at least one point position along the outer surface and the at least one point position along the inner surface 708, calculating a standard deviation of the thickness of the dome within the ROI 710, and determining the standard deviation is less than a predetermined value 712.

Block 702 may include measuring points of position slices on the outer surface of the dome. For example, a point and position should be selected on the outer surface of the dome. A coordinate-measuring machine (CMM) or similar tool may be used to densely measure the positions of points along the surface of the dome. The CMM may be used to measure the XYZ positions on both the outer and inner surfaces of the dome.

Block 704 may include measuring inner surface points that are normal to each outer surface point. For example, for every outer point measured, a line may be traced normal to the surface of the dome. Then, the position of the point where the line intersects the inner surface may be measured. The positions of the points on the outer surface should be normal to each point on the inner surface. As previously mentioned, a CMM may be used.

Block 706 may include calculating the thickness of the dome at each pair of inner and outer points based on blocks 702 and 704. Specifically, the thickness value may be measured between each pair of points. This may be the distance between the inner and outer points. In an example embodiment, the thickness of the dome in block 706 can also be measured directly with optical methods such as interferometrically or using a confocal microscope.

Block 708 may include, at each thickness measurement position, defining a spherical region of interest (ROI) centered at every measurement position with a radius that represents the LiDAR beam width (e.g. 6 mm). Specifically, for each measurement position, all of the points within a 6 millimeter radius sphere of the measurement point should be selected. Blocks 702 through 706 may be repeated for each of the points within the ROI. Using this subset of points, block 710 may include calculating the standard deviation of the thickness values within the ROI. This standard deviation is the thickness root mean square (RMS) value associated with the measurement point. The process should then be repeated for the remainder of the dome and all of the root mean square values should be compiled.

Block 712 may include determining that the dome passes inspection when a percentile value of root mean square values is less than a predetermined value. For example, a percentile value (eg. 95th percentile) is defined such that the standard deviation values must fall under it in order for the part to be considered acceptable. The $95^{th}$ percentile value of the root mean square values (i.e. the RMS value under which 95% of the RMS values lie) should be determined. If the $95^{th}$ percentile value is less than 4 micrometers, the dome is acceptable. Therefore, the wall of the dome may have a root mean square thickness variation that is less than 4 micrometers. Determining that 95% of the RMS values are under 4 micrometers may indicate that the dome has a high optical quality that may have acceptable TWE.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A system comprising:
   a base;
   at least one light detection and ranging (LiDAR) device coupled to the base, wherein the at least one LiDAR device is configured to transmit and receive light having one or more wavelengths; and
   a housing encompassing the at least one LiDAR device, wherein the housing is statically coupled to the base, and wherein the housing comprises:
      a dome, wherein the dome comprises:
         dome threads coupled to an outer surface of the dome;
         a conductive coating, wherein the conductive coating is coupled to an outer surface of the dome, wherein the conductive coating covers the dome threads, and wherein the conductive coating on the dome is configured to electromagnetically shield the at least one LiDAR device; and
      a wall that is transparent to the one or more wavelengths, and wherein the wall comprises a high impact polymethyl methacrylate (PMMA) material having an index of refraction of less than 1.55.

2. The system of claim 1, wherein the wall has a substantially uniform thickness, wherein an average thickness of the wall is 2 millimeters, and wherein the wall has a root mean square thickness variation that is less than 4 micrometers.

3. The system of claim 1, wherein the one or more wavelengths are infrared wavelengths.

4. The system of claim 1, wherein the dome further comprises a circular dome rim and a dome crown, and wherein the circular dome rim is positioned on the dome opposite the dome crown.

5. The system of claim 4, wherein the circular dome rim is coupled to the base via the dome threads.

6. The system of claim 4, further comprising a locking mechanism, wherein the locking mechanism comprises at least one of a fastener extending through the base and abutting the dome threads positioned adjacent to the circular dome rim, a bayonet connector adjacent to the circular dome rim, a flange with a screwed on retaining ring adjacent to the circular dome rim, or a snap adjacent to the circular dome rim.

7. The system of claim 1, wherein the dome further comprises an anti-abrasion coating.

8. The system of claim 1, wherein the base further comprises a plurality of bus bars electrically connected to the conductive coating on the dome.

9. The system of claim 1, wherein the at least one LiDAR device is rotatably coupled to the base.

10. The system of claim 1, wherein the high impact PMMA has a Rockwell hardness of at least F.

11. The system of claim 1, wherein the high impact PMMA material is dyed such that the wall blocks visible light.

12. The system of claim 11, wherein the wall is transparent to infrared light.

13. The system of claim 1, wherein the dome is made of an injection molded high impact PMMA material.

14. The system of claim 1, wherein the dome is a five control point cubic spline configured to minimize deflection and defocus over a field of view.

15. The system of claim 1, further comprising at least one center baffle, wherein the at least one center baffle is configured to attenuate internal reflections.

16. The system of claim 15, wherein the at least one center baffle extends from the at least one LiDAR device and comprises two or more front-back baffles that are perpendicularly coupled to the one or more center baffle and configured to block ghost signals.

17. The system of claim 15, wherein the at least one center baffle comprises a material that absorbs a wavelength of light emitted by the LiDAR device.

18. A LiDAR dome comprising:
a circular rim;
a wall extending from the circular rim, wherein the wall is transparent to one or more wavelengths, wherein the wall convenes to form a crown such that the wall is a dome with a height greater than its diameter, and wherein the wall defines a cavity;
a high impact polymethyl methacrylate (PMMA) material having an index of refraction of less than 1.55;
dome threads coupled to an outer surface of the dome; and
a conductive coating, wherein the conductive coating is coupled to an outer surface of the dome, wherein the conductive coating covers the dome threads, and wherein the conductive coating is configured to electromagnetically shield a LiDAR system.

19. The LiDAR dome of claim 18, further comprising a plurality of screw threads positioned on the wall adjacent to the circular rim and opposite the crown.

* * * * *